(12) United States Patent
Oda

(10) Patent No.: US 7,609,306 B2
(45) Date of Patent: Oct. 27, 2009

(54) SOLID-STATE IMAGE PICKUP APPARATUS WITH HIGH- AND LOW-SENSITIVITY PHOTOSENSITIVE CELLS, AND AN IMAGE SHOOTING METHOD USING THE SAME

(75) Inventor: Kazuya Oda, Asaka (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 597 days.

(21) Appl. No.: 11/280,288

(22) Filed: Nov. 17, 2005

(65) Prior Publication Data

US 2006/0109357 A1  May 25, 2006

(30) Foreign Application Priority Data

Nov. 19, 2004 (JP) ............................. 2004-336311

(51) Int. Cl.
  *H04N 9/083* (2006.01)
  *H04N 3/14* (2006.01)
(52) U.S. Cl. ........................... 348/273; 348/311
(58) Field of Classification Search ................ 348/294, 348/302, 311, 315, 223.1–225.1, 273, 280
See application file for complete search history.

(56) References Cited

U.S. PATENT DOCUMENTS 6,211,915 B1 * 4/2001 Harada ...................... 348/298

2003/0048371 A1 * 3/2003 Oda ........................... 348/312
2003/0206235 A1 * 11/2003 Suzuki ....................... 348/304
2004/0046883 A1 * 3/2004 Suzuki ....................... 348/315

FOREIGN PATENT DOCUMENTS

JP  04-298175  10/1992

* cited by examiner

Primary Examiner—Timothy J Henn
(74) Attorney, Agent, or Firm—McGinn IP Law Group, PLLC

(57) ABSTRACT

A solid-state image pickup apparatus includes high-sensitivity photosensitive cells and low-sensitivity photosensitive cells alternating with each other in the horizontal and vertical directions. The color filter has first portions where red is assigned to the high-sensitivity photosensitive cells, second portions where blue is assigned to the low-sensitivity photosensitive cells, third portions where blue is assigned to the high-sensitivity and fourth portions where red is assigned to the low-sensitivity photosensitive cells. The apparatus is selectively operable in a progressive read mode for reading out signal charges from all of the photosensitive cells or a thin-out read mode for reading them out while thinning out the photosensitive cells. The thin-out read mode includes a mode for reading out signal charges from at least one of the first and second portions and a mode for reading them out from at least one of the third and fourth portions.

22 Claims, 7 Drawing Sheets

SOLID-STATE IMAGE PICKUP APPARATUS WITH HIGH- AND LOW-SENSITIVITY PHOTOSENSITIVE CELLS, AND AN IMAGE SHOOTING METHOD USING THE SAME

BACKGROUND OF THE INVENTION

1. Field of the Invention

The present invention relates to an image pickup apparatus for converting incident light from a desired field to an electric signal to take the image of the field, and an image shooting method using the same. The present invention is advantageously applicable to an electronic still camera, image inputting unit, movie camera, cellular phone or similar imaging apparatus using photosensitive cells with a relatively higher optical sensitivity characteristic and photosensitive cells with a relatively lower optical sensitivity characteristic.

2. Description of the Background Art

Japanese patent laid-open publication No. 298175/1992, for example, discloses a solid-state image pickup apparatus including an image sensor in which photosensitive cells with a relatively lower optical sensitivity, or photoelectric conversion sensitivity, characteristic and photosensitive cells with a relatively higher photoelectric conversion sensitivity characteristic are arranged for enhancing the dynamic range of the apparatus. More specifically, the image sensor has photosensitive cells, or pixels, having a relatively larger photosensitive area each and other photosensitive cells having a relatively smaller photosensitive area each arranged in horizontal lines alternating with each other. For example, the larger and smaller photosensitive cells are arranged on odd- and even-numbered lines, respectively. When bright light is incident on the image sensor, the apparatus clips the outputs of the larger photosensitive cells above a preselected level and then adds the outputs of the smaller photosensitive cells to the outputs of the larger photosensitive cells.

The image pickup apparatus taught in Japanese patent laid-open publication mentioned above has the following problems left unsolved. First, the layout of the photosensitive cells, constituting the image sensor, is strictly limited because the size of the photosensitive cells is determined in dependent upon the lines in which they are involved in order to allow signal charges stored in the two kinds of photosensitive cells to be read out independently of each other. Second, adding the outputs of the larger and smaller photosensitive cells, which are arranged on a respective line each, means obtaining one line of information from two lines of information, so that image resolution available with the image pickup apparatus is substantially halved. Third, because the outputs of the larger or high-sensitivity photosensitive cells are clipped above a preselected level when the outputs of the larger and smaller photosensitive cells are added, the S/N (Signal-to-Noise) ratio of the high-sensitivity cells is reduced.

Moreover, the document stated above does not even suggest how it thins out the outputs of the photosensitive cells in a movie mode.

SUMMARY OF THE INVENTION

It is an object of the present invention to provide a solid-state image pickup apparatus capable of guaranteeing high resolution and a high S/N ratio while enhancing the dynamic range to thereby insure high image quality and capable of executing an adequate thin-out mode operation, and an image shooting method using the same.

A solid-state image pickup apparatus of the present invention includes a plurality of photosensitive cells bidimensionally arranged in a photosensitive array on which incident light is condensed for converting the incident light to signal charges. A color filter is assigned to the plurality of photosensitive cells for separating the incident light to red, green and blue, which are three primary colors. A driver causes the signal charges output from the plurality of photosensitive cells to be transferred at a predetermined timing in response to a drive signal. The plurality of photosensitive cells comprise first photosensitive cells with a first photoelectric conversion sensitivity characteristic and second photosensitive cells with a second photoelectric conversion sensitivity characteristic lower than the first photoelectric conversion sensitivity. The first and second photo sensitivity cells alternate with each other in the horizontal and vertical directions of a bidimensional arrangement. The color filter is made up of first portions where red is assigned to the first photosensitive cells, second portions where blue is assigned to the second photosensitive cells, third portions where blue is assigned to the first photo sensitive cells and fourth portions where red is assigned to the second photosensitive cells. Further, a mode selector designates, among modes in which the signal charges may be read out from the plurality of photosensitive cells, at least either one of a progressive read mode for reading out signal charges from all of the plurality of photosensitive cells and a thin-out read mode for reading out signal charges while thinning out the plurality of photosensitive cells. A drive signal generator generates the drive signal in accordance with the mode designated by the mode selector and feeds the drive signal to a circuit selected. The thin-out read mode includes a mode for reading out signal charges from at least one of the first and second portions of the color filter and a mode for reading out signal charges from at least one of the third and fourth portions of the same.

An image shooting method is also disclosed using the solid-state image pickup apparatus having the above configuration.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENT

Briefly, a solid-state image pickup apparatus in accordance with the present invention includes an image sensor generally made up of first portions where red is assigned to photosensitive cells with a relatively higher photoelectric conversion sensitivity characteristic, second portions where blue is assigned to photosensitive cells with a relatively lower photoelectric conversion sensitivity characteristic, third portions where blue is assigned to photosensitive cells with the relatively higher photoelectric conversion sensitivity characteristic, and fourth portions where red is assigned to photosensitive cells with the relatively lower photoelectric conversion sensitivity characteristic.

In a movie mode or similar thin-out pickup mode, signal charges are read out from at least one of the first and second portions when color temperature is higher, or from at least one of the third and fourth portions when color temperature is lower. This successfully prevents the outputs from the photosensitive cells from saturating without regard to color temperature, whereby a broader dynamic range is available with the image pickup apparatus.

Figure 1:
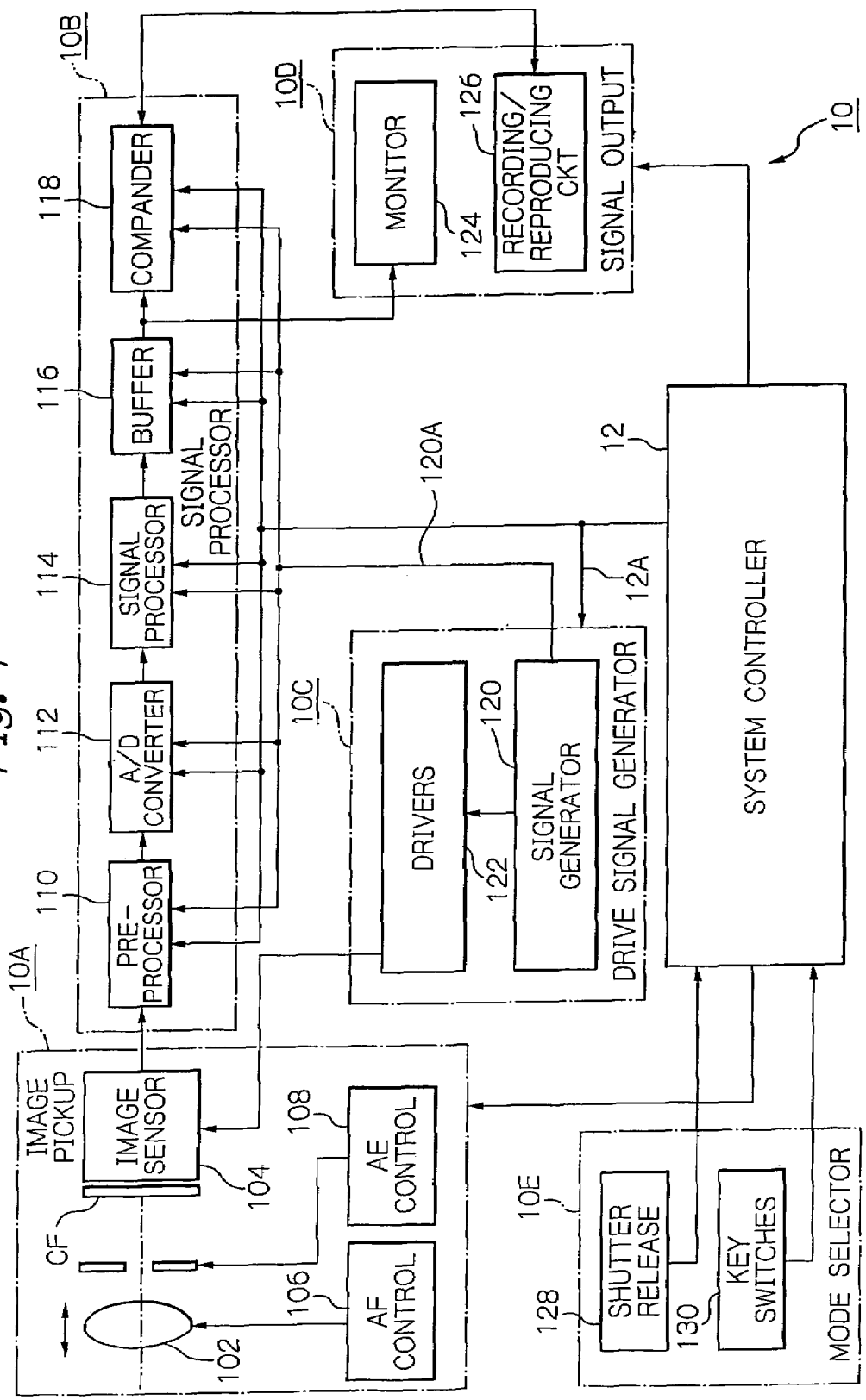
FIG. 1 is a schematic block diagram showing a preferred embodiment of the image pickup apparatus in accordance with the present invention.

Referring to FIG. 1 of the accompanying drawings, a solid-state image pickup apparatus embodying the present invention is implemented as a digital still camera by way of example. As shown, the digital still camera, generally 10, is generally made up of an image pickup section 10A, a signal processor 10B, a drive signal generator 10C, a signal output section 10D, a mode selector 10E and a system controller 12, which are interconnected as illustrated.

The image pickup section 10A includes a lens system 102, an image sensor 104, a color filter CF positioned at the light incidence side of the image sensor 104, an automatic focus (AF) control mechanism 106 and an automatic exposure (AE) control mechanism 108 including an iris diaphragm. A shutter mechanism, not show, may be positioned at the light incidence side of the image sensor 104 for fully intercepting incident light, if desired. The lens system 102 constitutes optics for focusing incident light representative of a field to be shot on the photosensitive array of the image sensor 104.

Figure 2:
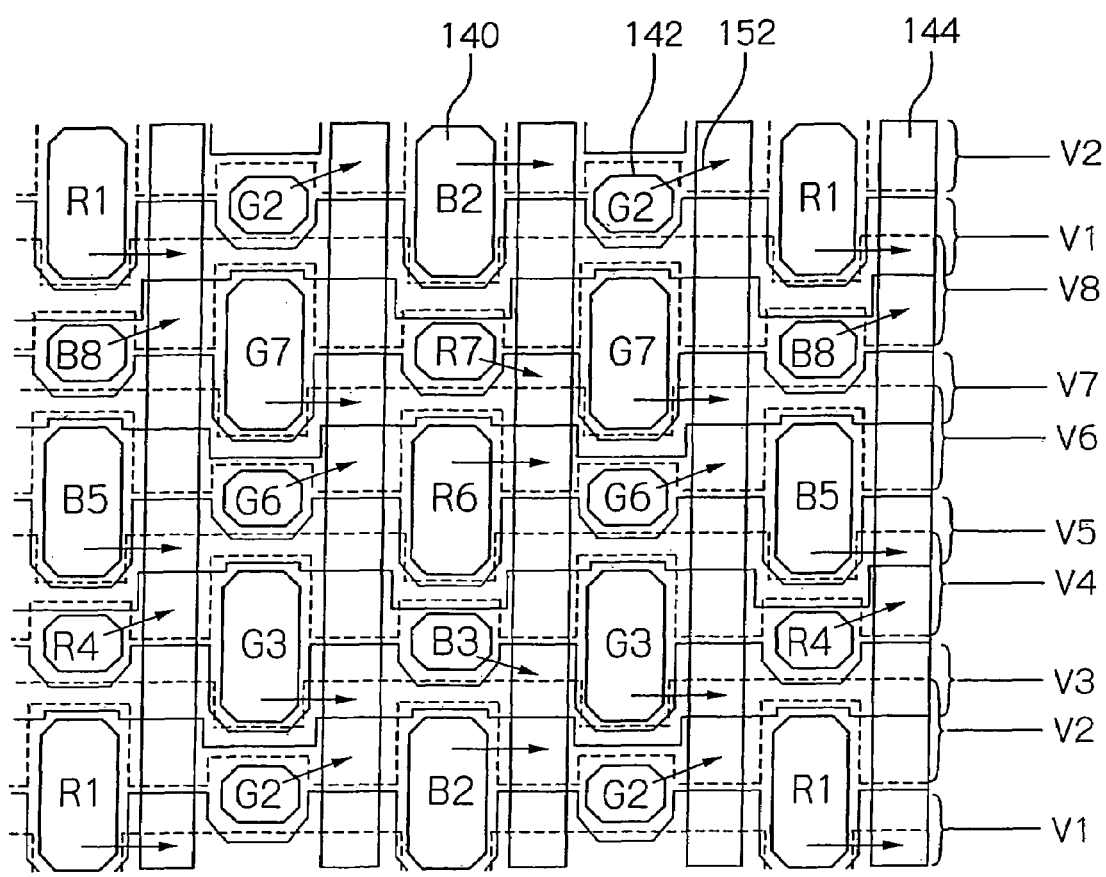
FIG. 2 is a schematic view as seen from a light incidence side, showing part of the arrangement of photosensitive cells, color filter segments and vertical transfer paths included in the illustrative embodiment shown in FIG. 1.

FIG. 2 shows part of a specific configuration of the photosensitive array of the image sensor 104. As shown, photosensitive cells 140 and 142 are bidimensionally arranged in the photosensitive array in the direction of rows and the direction of column. Also shown in FIG. 2 are color filter segments constituting the color filter CF, FIG. 1, and vertical transfer paths 144. The color filter segments are assigned one-to-one to the photosensitive cells 140 and 142. In the illustrative embodiment, the photosensitive cells 140 and 142 are provided with a relatively higher and a relatively lower photoelectric conversion sensitivity characteristic, respectively. More precisely, the photosensitive cells 140 have the photoelectric conversion sensitivity characteristic thereof higher than that of the other photosensitive cells 142. In this sense, let the photosensitive cells 140 and 142 be referred to as high-sensitivity and low-sensitivity photosensitive cells 140 and 142, respectively, hereinafter. With the illustrative embodiment, the high-sensitivity photosensitive cells 140 are provided with a larger photosensitive area than the low-sensitivity photosensitive cells 142 each. The photosensitive cells 140 and 142 alternate with each other in the vertical and horizontal directions of the bidimensional arrangement.

The high-sensitivity photo sensitive cells 140 are laid out in a so-called honeycomb pattern. This allows pixel data at the position of each low-sensitivity photosensitive cell 142 intervening between near by high-sensitivity photosensitive cells 140 to be accurately obtained by correcting the outputs of a plurality of photosensitive cells 140 around the photosensitive cell 142. For example, image data at the position of a photosensitive cell G6 may be produced by averaging the outputs of the photosensitive cells G7 and G3 positioned above and below the photosensitive cell G6, respectively. Therefore, the illustrative embodiment achieves two times higher resolution than the solid-state image pickup apparatus taught in Japanese patent laid-open publication No. 298175/1992 stated previously.

When the moderate amount of light representative of a field to be shot is incident to the photosensitive array of the image sensor 104, only the outputs from the high-sensitively photosensitive cells 140 suffice to render the image of the field. On the other hand, when the quantity of incident light is great, the outputs of the low-sensitivity photosensitive cells 142 will be added to the outputs of the high-sensitivity photosensitive cells 140 in order to broaden the dynamic range.

The low-sensitivity photosensitive cells 142 are arranged in a honeycomb pattern like the high-sensitivity photosensitive cells 140. Therefore, image data corresponding to the position of any one of the high-sensitivity photosensitive cells 140, intervening between nearby low-sensitivity photosensitive cells 142, can also be obtained by correcting the outputs of a plurality of photosensitive cells 142 around the photosensitive cell 140 in the same manner as the image data at the position of each low-sensitivity photosensitive cell 142.

In the illustrative embodiment, there may be arranged photosensitive cells having any one of three or more different areas each. Of course, the photoelectric conversion sensitivity characteristic may be varied by, e.g., varying the optical transmissivity of a film covering the light-incident surface of the individual photosensitive cell or by positioning a microlens having a particular condensing ability at the light-incident side of each photosensitive cell instead of by varying the photosensitive area. Such different schemes may even be suitably combined, if desired.

The color filter CF, FIG. 1, has color filter segments positioned in one-to-one correspondence to the light-incidence side of the photosensitive cells 140 and 142 and formed integrally with the photo sensitive cells 140 and 142. The color filter segments separate incident light into three primary color components R (red), G (green) and B (blue), so that particular one of the primary color components R, G and B is incident on each photosensitive cell 140 or 142. In FIG. 2, alphabets R, G and B are entered in the photosensitive cells 140 and 142 in order to indicate which of the primary colors R, G and B is assigned to each photosensitive cell 140 or 142.

Each high-sensitivity photosensitive cell R1 is paired with a particular low-sensitivity photosensitive cell R4 adjacent thereto in the vertical direction. This is also true with the high-sensitivity photosensitive cells B5, G3, G7, B2 and R6 and low-sensitivity photosensitive cells B8, G2, G6, B3 and R7, respectively, adjacent to each other in the vertical direction. In the illustrative embodiment, the color filter segments assigned to each pair of photosensitive cells are provided with the same color for the following reason. Although the complete transfer of a signal charge to the next pixel is obstructed when the transfer efficiency of a vertical transfer path is low, a pair of photosensitive cells of the same color successfully make it more difficult for a residual signal charge to be sensed than a pair of photosensitive cells of different colors.

It is to be noted that numbers 1 to 8 included in the legends of the photosensitive cells R1, B5, G3, G7, B2, R6, R4, B8, G2, G6, B3 and R7 correspond to identification numbers assigned to vertical transfer electrodes, which will be described specifically later.

In the illustrative embodiment, a plurality of pairs of green pixels are arranged throughout every other column while a plurality of pairs of red and a plurality of pairs of blue are arranged vertically and horizontally on the other columns while alternating with each other. Thus, considering each pair as a single pixel, the color filter segments shown in FIG. 2 are arranged in a G stripe, RB full-checkerboard pattern.

Also, as for the horizontal lines or rows of color filters, the high-sensitivity photosensitive cells R1 and B2 are positioned on the first row from the bottom while the high-sensitivity photosensitive cells R6 and B5 are positioned on the third row from the bottom. Likewise, the low-sensitivity photosensitive cells R4 and B3 and low-sensitivity photosensitive cells R7 and B8 are positioned on the second row and fourth row from the bottom, respectively.

Figure 3:
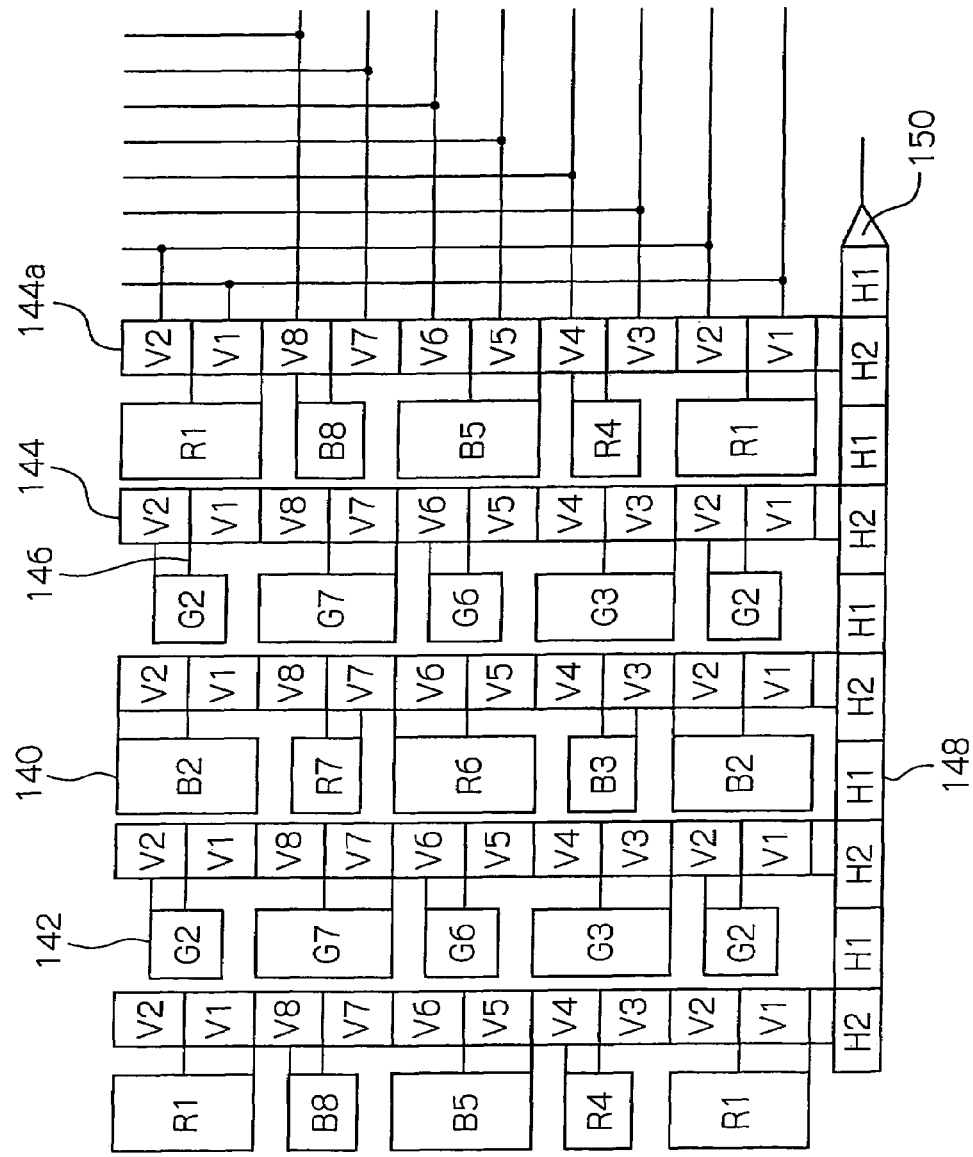
FIG. 3 is a schematic view which is a simplified form of FIG. 2.

The image sensor 104 operates in response to drive signals output from the drive signal generator 10C, as will be described specifically later. The structure of the image sensor 104 will be described more specifically with reference to FIG. 3. As shown, a transfer gate, or read-out gate, 146 is formed between the photosensitive cells 140 and 142 and vertical transfer devices adjoining them in order to read out signal charges derived from incident light to the vertical transfer devices. FIG. 3 is identical with FIG. 2 but simplified for emphasizing the essential configuration of FIG. 2.

The transfer gates 146 are adapted to transfer the signal charges read out from the photosensitive cells 140 and 142 to the vertical-transfer paths 144 in response to field shift pulses input via the associated electrodes. Each vertical transfer path 144, constituted by charge-coupled devices (CCDs), sequentially transfers the signal charges thus read out in the vertical direction or direction of columns. The signal charges vertically transferred via the vertical transfer paths 144, i.e., subjected to line shift are input to a horizontal transfer path 148 constituted by a horizontal line of transfer devices. The horizontal transfer path 148 delivers the signal charges to the signal processor 10B via an output amplifier 150 in response to a drive signal, as stated earlier.

In the case where a four-phase or an eight-phase drive signal is used to transfer signal charges in the vertical direction, it is necessary to position, between nearby transfer devices from which signal charges should be read out, three transfer devices from which signal charges are not read out. The three transfer devices thus positioned suffice to provide an interval or separation between the read-out of signal charges from the photosensitive cells 140 and 142 for there by preventing the signal charges from being mixed up.

Also, in a photo mode, signal charges are read out from all photosensitive cells by interlace scanning. On the other hand, in a movie or similar mode in which signal charges do not have to be read out from all photosensitive cells, signal charges are read out with vertical lines of pixels thinned out. In this mode, the illustrative embodiment switches lines to be thinned out in accordance with color temperature.

More specifically, when color temperature is low, red signal charges are read out from the low-sensitivity photosensitive cells 142 while blue signal charges are read out from the high-sensitivity photosensitive cells 140. This successfully prevents the signal charges output from the photosensitive cells 142 from reaching the saturation range because the sensitivity of red pixels is lower, and guarantees the signal strength of the photosensitive cells 140 because the sensitivity of blue pixels is higher.

On the other hand, when color temperature is high, red signal charges are read out from the high-sensitivity photosensitive cells 140 while blue signal charges are read out from the low-sensitivity photosensitive cells 142. This successfully prevents signal charges output from the photosensitive cells 142 from reaching the saturation range because the sensitivity of blue pixels is lower, and guarantees the signal strength of the photosensitive cells 140 because the sensitivity of red pixels is higher. In this manner, by switching the lines of pixels to be thinned out in accordance with color temperature, it is possible to protect signal charges read out from the photosensitive cells from saturation and therefore to broaden the dynamic range of the camera 10.

Giving consideration to the above conditions, the illustrative embodiment arranges the transfer gates 146 between the photosensitive cells 140 and 142 and the vertical transfer paths 144, as shown in FIGS. 2 and 3. In FIG. 2, the positions of the transfer gates 146 are indicated by arrows 152 directed from the photosensitive cells 140 and 142 toward the vertical transfer paths 144.

In the movie mode, when color temperature is high, field shift pulses are applied only to vertical transfer devices V1 to which the photosensitive cells R1 are connected and vertical transfer devices V3 to which the photosensitive cells B3 and G3 are connected for thereby reading out signal charges only from the photosensitive cells R1, B3 and G3. Consequently, signal charges of blue pixels are prevented from saturating. The output of the low-sensitivity photosensitive cell B3 is corrected by the signal processor 10B, which will be described specifically later.

When color temperature is low, field shift pulses are applied only to vertical transfer devices V7 to which the photosensitive cells R7 and G7 are connected and vertical transfer devices V5 to which the photosensitive cells B5 are connected for thereby reading out signal charges only from the photosensitive cells R7, G7 and B5. Although signal charges read out from the red pixel are increased when color temperature is low, they do not saturate because the sensitivity is low. The output of the low-sensitivity photosensitive cell R7 is also corrected by the signal processor 10B to be described specifically later.

In any case, green pixels are located at the high-sensitivity photosensitive cells 140. When color temperature is not high or low, any one of the lines stated above may be selected, i.e., signal charges may be read out from either one of the vertical transfer devices V1 and V3 and vertical transfer devices V5 and V7.

In the photo mode, signal charges are read out from all pixels by interlace scanning. For example, signal charges are read out in the first field from the vertical transfer devices V1, V3, V5 and V7, and then in the second field signal charges are read out from the vertical transfer devices V2, V4, V6 and V8. At this instant, the pixel arrangement shown in FIGS. 2 and 3 prevent the signal charges read out from being mixed up.

In the photo mode, signal charges read out from the high-sensitivity and low-sensitivity photosensitive cells 140 and 142 are written to a memory together. So long as the luminance of a subject picked up lies in a range that can be attained by the photosensitive cells 140, only the data derived from the photosensitive cells 140 are read out from the memory and then subjected to signal processing. In this case, pixel data at positions where the photosensitive cells 140 are absent are generated by interpolation using the data of adjoining photosensitive cells 140. For example, pixel data at a position between the photosensitive cells G3 and G7 may be implemented as a mean value of data derived from the photosensitive cells G3 and G7.

If the luminance of the subject shot does not lie in the range attained by the photosensitive cells 140, data derived from both of the photosensitive cells 140 and 142 are read out from the memory and then subjected to signal processing. For example, the data of the photosensitive cells 140 may be added to the data of the photosensitive cells 142 in order to broaden the dynamic range.

When attention is paid to the positions of the photosensitive cells 140 or 142, they are arranged in a honeycomb pattern, i.e., the photosensitive cells or pixels 140 or 142 are obliquely shifted from each other by half a pitch in the horizontal and vertical directions. Therefore; by applying the same interpolation scheme to data originating from both of the photosensitive cells 140 and 142, it is possible to generate pixel data for positions where the photosensitive cells 140 or 142 are absent and then add them together. Consequently, the illustrative embodiment is capable of obviating the fall of the picture resolution ascribable to the photosensitive cells 142.

For example, actual data output from the photosensitive cell G6 and the mean value of data output from the photosensitive cells G3 and G7 are added together while actual data output from the photosensitive cell G3 and the mean value of the photosensitive cells G2 and G6 are added together. The remaining sections of the illustrative embodiment will be described specifically hereinafter.

Referring again to FIG. 1, the AF control mechanism 106 with the focus control mechanism, not shown, optimally focuses the lens system 102 in accordance with information representative of a range or distance of the object to be shot from the camera 10 determined by range finding. More specifically, the system controller 12 calculates the range and determines the amount of control in accordance with the resulting range information. Consequently, the AF control mechanism drives the focus control mechanism in response to a control signal fed from the system controller 12 for thereby focusing the lens system 102.

The system controller 12 includes an exposure control circuit, not shown, for calculating the photometric value of an imaging field including a desired subject. The AE control mechanism 108 drives the iris diaphragm mechanism under the control of the exposure control circuit for thereby controlling the quantity of incident light. For photometry, part of the image signal is used. In this case, too, the system controller 12 calculates a lens opening or exposure value in accordance with the photometric value and then feeds the AE control mechanism 108 with a control signal for controlling a lens opening and a shutter speed that implement the corresponding optical aperture of the lens opening. In response, the AE control mechanism 108 controls the iris diaphragm and shutter mechanisms to thereby accomplish optimum exposure.

In the photo mode, the system controller 12, having calculated the lens opening on the basis of the photometric value, determines whether or not the lens opening lies in the range that can be available with the high-sensitivity photosensitive cells 140. If the answer of this decision is positive, then the system controller 12 sends a control signal to a signal processor 114, which will be described specifically later, for causing the latter to process only signals output from the high-sensitivity photosensitive cells 140. If the answer of the above decision is negative, then the system controller 12 causes the signal processor 114 to add signals output from the high-sensitivity and low-sensitivity photosensitive cells together, as stated previously.

On the other hand, in the movie mode, the system controller 12 determines the color temperature of the subject, as will be described hereinafter. While some different methods are available for determining color temperature, the illustrative embodiment compares the ratio of the color B to the color G, B/G, with the ratio of the color R to the color G, R/G to determine color temperature. More specifically, the system controller 12 determines the ratio of the accumulated B value to the accumulated G value, B/G, and the ratio of the accumulated R value to the accumulated G value, R/G, with image data constituting a single frame picked up. The system controller 12 then determines that color temperature is high if the ratio B/G is greater than the ratio R/G or that it is low if the ratio R/G is greater than the ratio B/G.

Subsequently, the system controller 12 sends the result of the above decision on color temperature to the drive signal generator 10C and signal processor 114 included in the signal processor 10B. In response, the drive signal generator 10C generates a drive signal, which will be described later, in accordance with the color temperature. The signal processor 114 corrects the outputs of the photosensitive cells B3 if the color temperature is high or corrects the outputs of the photosensitive cells R7 if it is low.

The signal processor 10B includes a preprocessor 110, an analog-to-digital (A/D) converter 112, a buffer 116 and a compander 118 in addition to the signal processor 114, which are interconnected as shown in FIG. 1. The preprocessor 110 executes, e.g., correlated double sampling (CDS) on the input signal charges in order to cancel noise, and executes gamma correction on an input signal in order to amplify the signal. The signal thus amplified is fed from the preprocessor 110 to the A/D converter 112.

The A/D converter 112 responds to a control signal 12A output from the system controller 12 and a clock signal 120A output from a signal generator 120, which is included in the drive signal generator 10C for generating various timing signals, to sample and quantize an analog signal fed from the image sensor 104 to thereby convert the analog signal to a corresponding digital signal. The resultant digital signal is fed from the A/D converter 112 to the signal processor 114.

The signal processor 114 executes automatic exposure (AE) control, automatic white balance (AWB) control, aperture correction and so forth on the digital signal input thereto, and then executes signal processing in accordance with either one of two different modes, i.e., the photo and movie modes selectable on the mode selector 10E. In the photo mode, data of a photo or still picture picked up is input at least to a recording/reproducing circuit 126 included in the signal output section 10D. Gamma correction may be executed at this stage or a stage to follow.

The system controller 12 sends a signal 12A representative of the photo or movie mode selected on the camera 10 to the signal processor 114. In response, in the photo mode, the signal processor 114 proceeds to appropriate or no addition of the signal processed as stated earlier to the signals derived from the photosensitive cells 140 and 142 as already described. In addition, the signal processor 114 executes other processing, e.g., broadens the frequency band of the luminance signal. On the other hand, in the movie mode, the signal processor 114 selects the photosensitive cells B3 or R7 in accordance with color temperature to execute the correction thereon.

Further, the signal processor 114 thins out the image signal in the vertical direction, so that a photo or a movie can be displayed on the monitor 124. In addition, the signal processor 114 converts the image signal output from the image sensor 104 to a recordable video signal and feeds the resultant video signal to the buffer 116.

The buffer 116 amplifies the video signal input from the signal processor 114 to a preselected amplitude level, and controls the timing when recording. Subsequently, the buffer 116 is responsive to the control of a record control circuit, not shown, included in the system controller 12 to feed image data to the signal output section 10D or the compander 118.

When the picture should be recorded in the recording/reproducing circuit 126, the image signal representative of the image is fed from the buffer 116 to the compander 118 under the control of the system controller 12. The compander 118 compresses the image signal in accordance with, e.g., the JPEG (Joint Photographic coding Experts Group) or similar conventional standard. On the other hand, when an image signal recorded in the recording/reproducing circuit 126 is read out, the compander 118 expands the image signal with a procedure opposite to the compression for thereby reproducing the original image signal and feeds the original image signal to the monitor 124.

The drive signal generator 10C includes drivers 122 in addition to the signal generator 120. The signal generator 120 generates a synchronous signal based on a local or reference clock generated locally, i.e., inside the camera 10 to drive the camera 10 in accordance with the current NTSC or PAL broadcast standard. The synchronous signal thus generated is fed to the signal processor 114. The signal generator 120 feeds a sampling and a read/write clock signal to the preprocessor 110, A/D converter 112, buffer 116 and compander 118 as well.

The signal generator 120 generates various synchronous signals from the local or system clock, and uses the synchronous signals to generate various timing signals. The timing signals include timing signals used to read out signal charges from the photosensitive cells 140 and 142 of the image sensor 104, e.g., a vertical timing signal for driving the vertical transfer paths, a horizontal timing signal for driving the horizontal transfer path, a field-shift timing signal and a line-shift timing signal. Signals output from the signal generator 120 are also used to control the operations of the AF and AE control mechanisms 106 and 108. While feeding the various signals to the above sections, the signal generator 120 delivers a vertical and a horizontal timing signal to the drivers 122, causing the drivers 122 to generate drive signals in response to the timing signals.

In the signal output section 10D, the monitor 124 is implemented by, e.g., a liquid crystal display (LCD) panel based on the digital RGB input VGA (Video Graphics Array) standard. The recording/reproducing circuit 126 writes the video signal input from the compander 118 in a magnetic recording medium, a semiconductor memory applicable to, e.g., a memory card, an optical recording medium, a magneto-optical recording medium or similar recording medium. The recording/reproducing circuit 126 is capable of reading out the recorded vide signal from the recording medium and displaying it on the monitor 124 in the form of a visual image, as desired.

The mode selector 10E includes a shutter release button 128 and key switches 130. In the illustrative embodiment, the shutter release button 128 is provided with a first and a second stepwise position or stroke, i.e., a half-depressed and a full-depressed position. The shutter release button 128 feeds, when depressed to its half-depressed or stroke position, a signal representative of the half-depressed position to the system controller 12, and then provides, when depressed to the full-depressed or stroke position, the system controller 12 with an image pickup timing. If the camera 10 is turned on and if a monitor switch, not shown, positioned on the camera 10 is turned on, the system controller 12 causes the monitor 124 to display the image of the field in the movie mode. Subsequently, when the shutter release button 128 is depressed to its full-stroke position, a signal indicative of the photo mode is fed from the mode selector 10E to the system controller 12.

The key switches 130 are implemented by four direction keys that allow the operator of the camera 10 to move a cursor viewed on the screen of the monitor 124 upward, downward, rightward or leftward for selecting, e.g., a desired item or image as conventional. Information thus selected on the key switches 130 is also fed to the system controller 12. The key switches 130maybe configured, if desired, to generate a command allowing the operator to thin out the pixels to, e.g., one-half, one-fourth or one-eighth and send the resulting information to the system controller 12. Such setting on the key switches 130 thus defines how signal charges should be read out in the movie mode.

In the illustrative embodiment, the mode selector 10E sets up either one of the photo and movie modes in accordance with the statuses of various switches. Alternatively, a switch or switches for selectively designating the photo or movie mode may be included in the mode selector 10E. While the illustrative embodiment causes the system controller 12 to determine color temperature, it may be modified to allow the operator to directly input information relating to the level of color temperature.

The system controller 12, controlling the entire camera 10, includes a CPU (Central Processing Unit) not shown. The system controller 12 is adapted to determine modes selected by the operator on the basis of the signal received from the shutter release key 128. The system controller 12 executes, e.g., processing on the image signal in accordance with information received from the key switches 130. The system controller 12 then controls the operation of the drive signal generator 10C on the basis of the result of the above decision. The system controller 12 further includes a record control circuit, not shown, configured to control the operation of the buffer 116 and of the recording/reproducing circuit 126 included in the signal output section 10D.

The operation of the digital still camera 10 having the above configuration will be described herein after. First, a progressive scanning mode, which is a usual read-out mode, will be described. The camera 10 is provided with the image sensor 104 operable in the processing scanning mode. Therefore, when the output signal of the shutter release button 128 is indicative of the photo mode, light incident on the image sensor 104 via the color filter CF having the honeycomb stripe pattern is usually processed over all the pixels of the image sensor 104. As a result, signal charges, resultant from the photoelectric conversion, are accumulated in the individual photosensitive cells 140 and 142.

Figure 4:
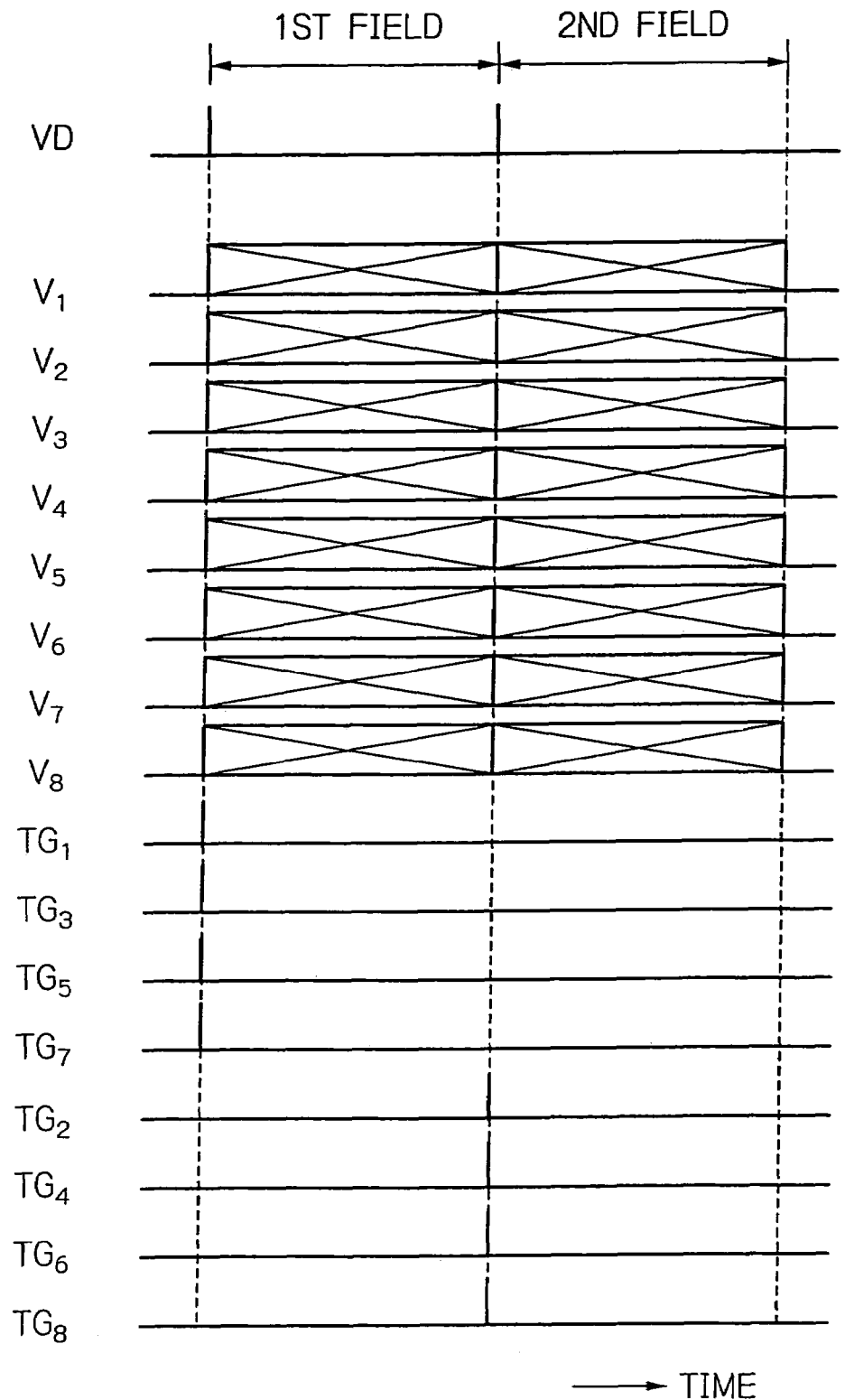
FIG. 4 is a timing chart showing a relation between a vertical synchronous signal, vertical drive signals and vertical timing signals generated by a signal generator included in the illustrative embodiment in a progressive read mode.

As shown in FIG. 4, to read out the signal charges from the photosensitive cells 140 and 142, the signal generator 120 generates a vertical synchronous signal VD. Also, the signal generator 120 generates, in synchronism with the vertical synchronous signal VD, vertical drive signals $V_1$ through $V_8$ to be applied to the transfer devices V1 through V8 of the vertical transfer paths 144, respectively, and vertical timing signals TG1 through TG8 to be applied to the transfer gates 146 via the transfer devices V1 through V8, respectively.

More specifically, in FIG. 4, the vertical timing signals TG1, TG3, TG5 and TG7 go high in the first field while the vertical timing signals TG2, TG4, TG6 and TG8 go high in the second field. The vertical timing signals TG1 through TG8 are generated to read out signal charges in synchronism with the vertical synchronous signal VD.

In the first field, when the transfer gates 146 are turned on, signal charges are read out only from the photosensitive cells corresponding in position to the transfer devices V1, V3, V5 and V7; a field shift is not effected until the input of the next vertical synchronous signal VD. Subsequently, after a field shift, the vertical drive signals $V_1$ through $V_8$ are sequentially applied, so that the signal charges shifted to the vertical transfer paths 144 are transferred toward the horizontal transfer path 148.

In the second field following the first field, the transfer gates 146 are turned on such that signal charges are read out only from the photosensitive cells corresponding to the vertical transfer devices V2, V4, V6 and V8. After a field shift following the signal read-out, the vertical drive signals $V_1$ through $V_8$ are sequentially input. It is to be noted that the vertical drive signals $V_1$ through $V_8$ are common to the first and second fields and common to the photo and movie or thin-out modes also.

Figure 5:
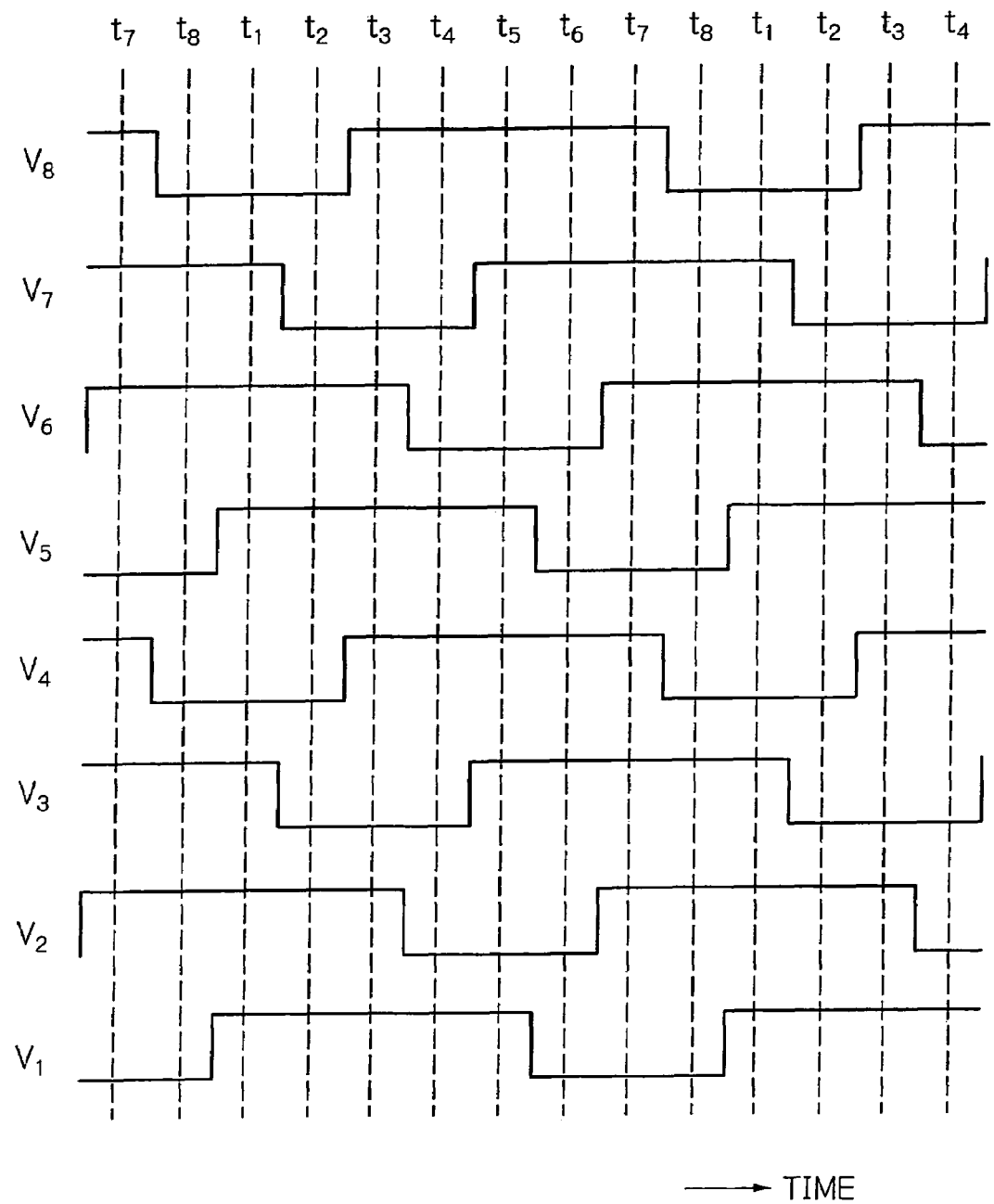
FIG. 5 is a timing chart showing the vertical drive signals of FIG. 4 more specifically.

FIG. 5 is a timing chart showing, in an enlarged scale with respect to time, the vertical drive signals $V_1$ through $V_8$ input after the vertical drive signal VD has gone high to read out signal charges to the vertical transfer paths 144. Let this particular time be assumed to be a time $t_0$ hereinafter. As shown, after the time $t_0$, the vertical drive signals $V_1$ through $V_8$ are applied at consecutive times $t_1$ through $t_8$. The vertical drive signals $V_1$ through $V_8$ each are applied to every eighth transfer device. Stated another way, every eighth transfer devices shown in FIG. 3 share the same vertical drive signal.

Figure 6:
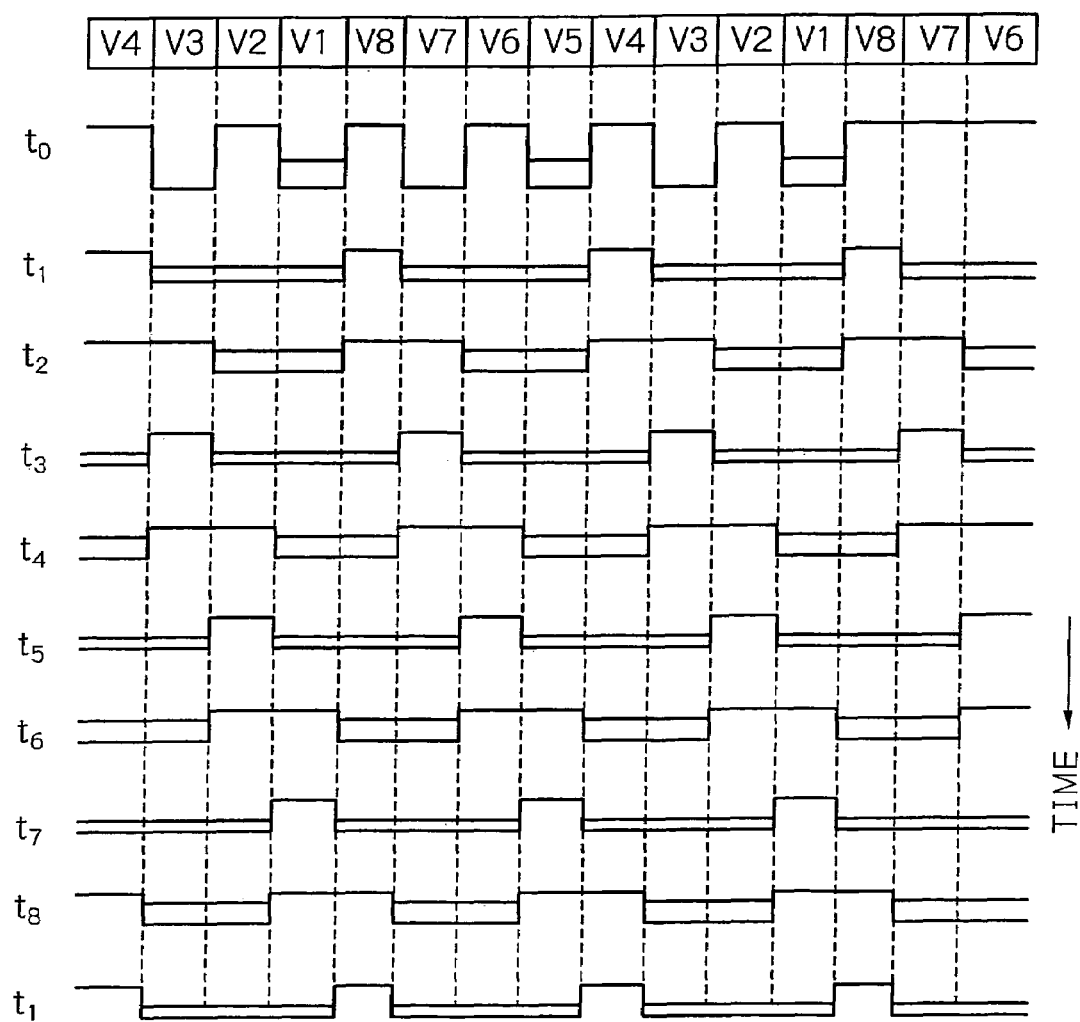
FIG. 6 is a timing chart useful for understanding how potentials are formed by the vertical timing and drive signals shown in FIG. 5.

As shown in FIG. 6, potentials are formed in the vertical transfer devices V1 through V8 when applied with the vertical drive signals $V_1$ through $V_8$. The potentials shown in FIG. 6 apply to the vertical transfer devices V1 through V8 constituting, among the vertical transfer paths shown in FIG. 3, the vertical transfer path 144a. Although field shift pulses are applied to the vertical transfer devices V1, V3, V5 and V7, signal charges are absent from the vertical transfer devices V3 and V7 because the vertical transfer devices V3 and V7 are not provided with the transfer gates 146. The potentials at the time $t_0$ are established when the vertical timing signals TG1, TG3, TG5 and TG7 are applied, and are deeper than the potentials formed by the vertical drive signals $V_1$ through $V_8$ shown in FIG. 5.

As FIG. 6 indicates, the signal charges shifted to each vertical transfer path 144 are sequentially transferred toward the horizontal transfer path 148. In FIG. 6, a single vertical transfer path 144 is represented by eight vertical transfer devices V1 through V8. It is to be noted that the vertical transfer devices V1 through V4 and V5 through V8 each share the same vertical drive signal, i.e., the vertical transfer devices V1 through V8 are essentially driven by the drive signals of four different phases. The signal charges thus vertically transferred are in turn transferred to the horizontal transfer path 148 by line shifts, and then sequentially transferred via the horizontal transfer path 148. Consequently, the signal charges of all pixels are successfully read out from the image sensor 104 at once within a predetermined period of time.

A shooting procedure generally available with the digital still camera 10 will be described hereinafter. First, before an actual shot, the operator of the camera 10 pushes the shutter release button 128 to its half-stroke or first position, conditioning the camera 10 for its photometry control mode. In the photometry control mode, AF control is executed by selecting only the G component of the signal produced by the image sensor 104 by photometric conversion because information represented by the G component amounts to about 70% of the entire luminance information, which is great enough for AF control. In addition, at the time of photometry for AF control, pixel information must be repeatedly read out a plurality of times to detect an adequate value and must therefore be read out as rapidly as possible.

On the other hand, as for AE and AWB control, photometry needs information on all colors, i.e., R, G and B components of the image signal. In this manner, reading of the color G alone and thin-out reading of the colors R, G and B are executed in the photometry control mode.

The image signal output from the image pickup section 10A during photometry is input to the signal processor 10B under the control of the system controller 12, and in turn converted to a corresponding digital signal or image data by the signal processor 10B. The image data thus output from the signal processor 10B are fed to the system controller 12 as photometry information. The system controller 12 performs operations on the input photometry information to generate an AF and an AE control signal and delivers the AF and AE control signals to the AF and AE control mechanisms 106 and 108, respectively, causing them to execute the expected control. That control will be repeated during the photometry control mode operation.

The photometry mode is followed by the photo mode. More specifically, the operator of the camera 10 depresses the shutter release button 128 to its full-stroke or second position at any desired timing. In response, the image pickup section 10A catches light incident thereon from the field. In this case, signals of all colors are produced from the image sensor 104 without any pixel being thinned out, i.e., by progressive scanning.

An image signal thus output from the image pickup section 10A is converted to a corresponding digital signal by the A/D converter 112 included in the signal processor 10B. The digital signal is fed from the A/D converter 112 to the signal processor 114. The signal processor 114 processes the digital signal in a manner depending on whether or not the digital signal lies in the range that can be covered only by the high-sensitivity photosensitive cells 140. In addition, the signal processor 114 executes processing on the image data such that the image data corresponding to a luminance signal and a color difference signal are further extended toward the high frequency side. The image data thus processed are delivered to the compander 118 via the buffer 116. The compander 118 compresses the image data and feeds the compressed image data to the signal output section 10D. In the photo mode, the image data of all pixels input to the signal output section 10D are written to the recording/reproducing circuit 126 under the control of the record control circuit of the system controller 12.

As stated above, the illustrative embodiment selectively establishes the photometry control mode or the photo mode in accordance with the position of the shutter release button 128. In an application in which the digital still camera 10 is adapted to shoot a scene with one million or more pixels, then a period of time necessary for progressive scanning is not so important in the photo mode except for continuous shooting. However, in the movie and photometry control modes, it is necessary to reduce the above period of time.

Figure 7:
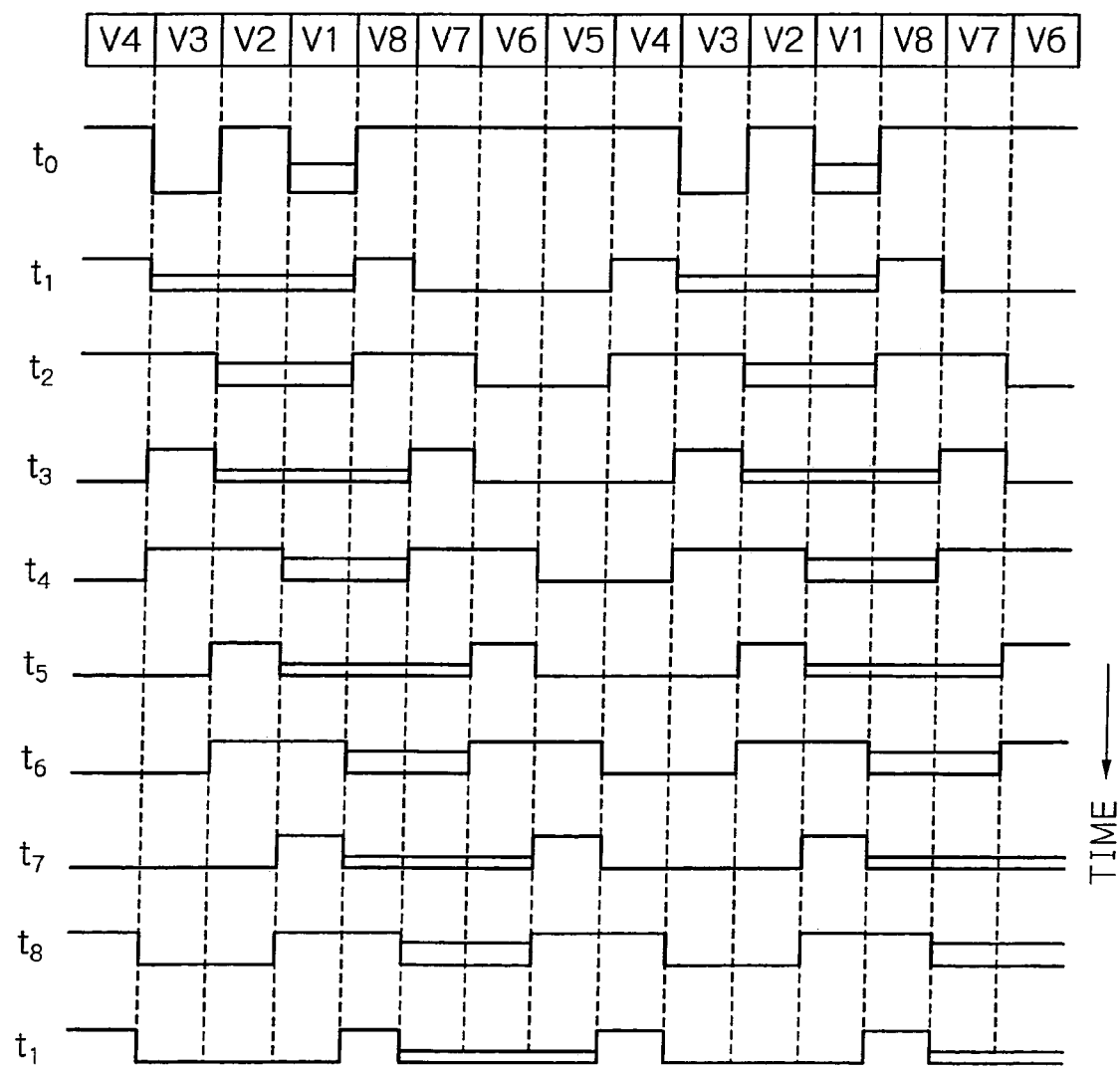
FIG. 7 is a timing chart showing potentials formed by the vertical timing and signals.

How the vertical timing signals TG1 through TG8 and vertical drive signals $V_1$ through $V_8$ are applied in the movie mode will be described hereinafter. Assume that color temperature is determined to be high in the movie mode. Then, only the vertical timing signals TG1 and TG3 go high while the other vertical timing signals TG2 and TG4 through TG8 remain in the low level thereof. When the vertical drive signals V1 through V8 are applied after the vertical timing signals TG1 through TG8, the potentials shown in FIG. 7 are formed in the vertical transfer devices V1 through V8 at times $t_0$ through $t_8$. The potentials shown in FIG. 7 apply to the vertical transfer devices V1 through V8 constituting the vertical transfer path 144a, FIG. 3.

As shown in FIG. 7, although the field shift pulses are applied to the vertical transfer devices V1 and V3 of the vertical transfer path 144a, a signal charge is not read out from the vertical transfer device V3 because the device V3 is not provided with the transfer gate 146. The potentials at the time $t_0$ is generated by the vertical timing signals TG1 and TG3 gone high. As FIG. 7 indicates, the signal charges shifted to the vertical transfer paths 144 are sequentially transferred toward the horizontal transfer path 148.

In summary, it will be seen that the present invention provides a solid-state image pickup apparatus having the following various unprecedented advantages. Photosensitive cells with a higher photoelectric conversion sensitivity characteristic and photosensitive cells with a lower photoelectric conversion sensitivity characteristic cooperate with each other to broaden the dynamic range of the apparatus. Because such two kinds of photosensitive cells are arranged alternately with each other in the vertical and horizontal directions, it is possible to efficiently use the photosensitive array of an image sensor for thereby protecting image quality from degradation. Further, a thin-out read mode includes a mode for reading a first and a second portion assigned to high color temperature and another mode for reading a third and a fourth portion assigned to low color temperature, realizing an adequate thin-out mode operation.

The entire disclosure of Japanese patent application No. 2004-336311 filed on Nov. 19, 2004, including the specification, claims, accompanying drawings and abstract of the disclosure is incorporated herein by reference in its entirety.

While the present invention has been described with reference to the particular illustrative embodiment, it is not to be restricted by the embodiment. It is to be appreciated that those skilled in the art can change or modify the embodiment without departing from the scope and spirit of the present invention.

What is claimed is:

1. A solid-state image pickup apparatus comprising:
    a plurality of photosensitive cells bidimensionally arranged in a photosensitive array on which incident light is condensed for convening the incident light to signal charges;
    a color filter assigned to said plurality of photosensitive cells for separating the incident light to red, green and blue, which are three primary colors;
    a driver for causing the signal charges output from said plurality of photosensitive cells to be transferred at a timing in response to a drive signal,
    said plurality of photosensitive cells comprising first photosensitive cells with a first photoelectric conversion sensitivity characteristic and second photosensitive cells with a second photoelectric conversion sensitivity characteristic lower than the first photoelectric conversion sensitivity, said first and second photosensitive cells alternating with each other in a horizontal direction and a vertical direction of a bidimensional arrangement;
    said color filter comprising first portions where red is assigned to said first photosensitive cells, second portions where blue is assigned to said second photosensitive cells, third portions where blue is assigned to said first photosensitive cells and fourth portions where red is assigned to said second photosensitive cells;
    a mode selector For designating, among modes in which the signal charges are read out from said plurality of photosensitive cells, at least either one of a progressive read mode for reading out signal charges from all of said plurality of photosensitive cells and a thin-out read mode for reading out signal charges while thinning out said plurality of photosensitive cells; and
    a drive signal generator for generating the drive signal in accordance with the mode designated by said mode selector and feeding the drive signal to a circuit selected;
    said thin-out read mode comprising a first mode for reading out signal charges from said first portions and said second portions, and a second mode for reading out signal charges from said third portions and said fourth portions.

2. The apparatus in accordance with claim 1, wherein said first photosensitive cells have a first photosensitive area, and said second photosensitive cells have a second photosensitive area smaller than the first photosensitive area.

3. The apparatus in accordance with claim 1, wherein each of said first photosensitive cells is paired with particular one of said second photosensitive cells which is adjacent to said first photosensitive cell in the vertical direction,
    said first and second photosensitive cells paired being assigned to a same color of said color filter.

4. The apparatus in accordance with claim 3, wherein said paired photosensitive cells to which green is assigned are arranged on and throughout every vertical line while said paired photosensitive cells to which red and blue are assigned are arranged on the other lines alternately with each other in the horizontal direction and the vertical direction of the bidimensional arrangement.

5. The apparatus in accordance with claim 1, wherein said first portions, said second portions, said third portions and said fourth portions respectively comprise, in the horizontal direction, first lines where red is assigned to said first photosensitive cells, second lines where blue is assigned to said second photosensitive cells, third lines where blue is assigned to said first photosensitive cells and fourth lines where red is assigned to said second photosensitive cells.

6. The apparatus in accordance with claim 1, further comprising:
    a controller for determining a color temperature of a subject to be picked up.

7. The apparatus in accordance with claim 6, wherein in said thin-out read mode, said controller controls said drive signal generator to generate a signal in accordance with said first mode if said color temperature of said subject is high, and said second mode if said color temperature of said subject is low.

8. The apparatus in accordance with claim 7, wherein said controller determines said color temperature of said subject by calculating, with image data constituting a single frame picked up, a ratio of an accumulated B value to an accumulated G value (B/G), and a ratio of an accumulated R value to an accumulated G value (R/G), and
    wherein said controller determines that said color temperature is high if the ratio B/G is greater than the ratio R/G, and that said color temperature is law if the ratio R/G is greater than the ratio B/G.

9. The apparatus in accordance with claim 8, wherein said thin-out read mode comprises a movie mode.

10. The apparatus in accordance with claim 9, which said controller includes an exposure control circuit for calculating the photometric value of an imaging field including said subject.

11. The apparatus in accordance with claim 10, further comprising:
    a signal processor for processing a signal from said drive signal generator, wherein said controller calculates a lens opening based on said photometric value, and in a photo mode, determines whether the lens opening lies in a range for the first photosensitive cells.

12. The apparatus in accordance with claim 11, wherein if it is determined that the lens opening lies in a range for the first photosensitive cells, then the controller sends a control signal to said signal processor for causing the signal processor to process only signals output from the first photosensitive cells, and if it is determined that the lens opening does not lie in a range for the first photosensitive cells then the controller causes the signal processor to add signals output from the first and second photosensitive cells.

13. A method of shooting an image, comprising:
causing a plurality of photosensitive cells bidimensionally arranged in a photosensitive array on which incident light is condensed to convert the incident light to signal charges;
separating, by a color filter assigned to the plurality of photosensitive cells, the incident light to red, green and blue, which are three primary colors;
transferring the signal charges output from the plurality of photosensitive cells at a timing in response to a drive signal;
providing the plurality of photosensitive cells with at least first photosensitive cells with a first photoelectric conversion sensitivity characteristic and second photosensitive cells with a second photoelectric conversion sensitivity characteristic lower than the first photoelectric conversion sensitivity, the first and second photosensitive cells alternating with each other in a horizontal direction and a vertical direction of a bidimensional arrangement;
providing the color filter with first portions where red is assigned to the first photosensitive cells, second portions where blue is assigned to the second photosensitive cells, third portions where blue is assigned to the first photosensitive cells and fourth portions where red is assigned to the second photosensitive cells;
designating, among modes in which the signal charges are read out from the plurality of photosensitive cells, at least one of a progressive read mode for reading out signal charges from all of the plurality of photosensitive cells and a thin-out read mode for reading out signal charges while thinning out the plurality of photosensitive cells; and
generating the drive signal in accordance with the mode designated, and feeding the drive signal to a circuit selected;
said thin-out read mode comprising a first mode for reading out signal charges from the first portions and said second portions, and a second mode for reading out signal charges from the third portions and the fourth portions, and
in said designating, one of the first mode and the second mode being designated.

14. The method of claim 13, further comprising:
determining a color temperature of a subject to be picked up.

15. The method of claim 14, further comprising:
in said thin-out read mode, generating a signal in accordance with said first mode if said color temperature of said subject is high, and said second mode if said color temperature of said subject is low.

16. The method of claim 15, wherein said determining said color temperature of said subject comprises:
calculating, with image data constituting a single frame picked up, a ratio of an accumulated B value to an accumulated G value (B/G), and a ratio of an accumulated R value to an accumulated G value (R/G); and
determining that said color temperature is high if the ratio B/G is greater than the ratio R/G, and that said color temperature is low if the ratio R/G is greater than the ratio B/G.

17. The method of claim 16, wherein said thin-out read mode comprises a movie mode.

18. The method of claim 17, further comprising:
calculating the photometric value of an imaging field including said subject.

19. The method of claim 18, further comprising:
calculating a tens opening based on said photometric value; and
in a photo mode, determining whether the lens opening lies in a range for the first photosensitive cells.

20. The method of claim 19, further comprising:
if it is determined that the lens opening lies in a range for the first photosensitive cells, then processing only signals output from the first photosensitive cells; and
if it is determined that the lens opening does not lie in a range for the first photosensitive cells, then adding signals output from the first and second photosensitive cells.

21. A method of reading out signal charges in a thin-out read mode of a solid-state image pickup apparatus including first photosensitive cells with a first photoelectric conversion sensitivity characteristic and second photosensitive cells with a second photoelectric conversion sensitivity characteristic lower than the first photoelectric conversion sensitivity, and a color filter having red, green and blue colors and which includes first portions where said red color is assigned to said first photosensitive cells, second portions where said blue color is assigned to said second photosensitive cells, third portions where said blue color is assigned to said first photosensitive cells and fourth portions where said red color is assigned to said second photosensitive cells, said method comprising:
determining a color temperature of a subject to be picked up;
if it is determined that said color temperature is high, reading out signal charges only from photosensitive cells to which said green color is assigned and photosensitive cells in said first and second portions; and
if it is determined that said color temperature is low, reading out signal charges only from photosensitive cells to which said green color is assigned and photosensitive cells in said third and fourth portions.

22. The method of claim 21, wherein solid-state image pickup apparatus further comprises:
a mode selector for designating a mode from among plural modes including a thin-out read mode for reading out signal charges from less than alt of said first and second photosensitive cells; and
a drive signal generator for generating a drive signal in accordance with the mode designated by said mode selector and feeding the drive signal to a circuit selected.

* * * * *

UNITED STATES PATENT AND TRADEMARK OFFICE
CERTIFICATE OF CORRECTION

PATENT NO.       : 7,609,306 B2  
APPLICATION NO.  : 11/280288  
DATED            : October 27, 2009  
INVENTOR(S)      : Kazuya Oda Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 941 days.

Signed and Sealed this

Twelfth Day of October, 2010

David J. Kappos  
*Director of the United States Patent and Trademark Office*